(12) United States Patent
Yamagishi

(10) Patent No.: US 10,745,058 B2
(45) Date of Patent: Aug. 18, 2020

(54) UPPER ARCH STRUCTURE OF VEHICLE BODY LATERAL SECTION

(71) Applicant: TOYOTA JIDOSHA KABUSHIKI KAISHA, Toyota-shi, Aichi-ken (JP)

(72) Inventor: Tohru Yamagishi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 16/140,978

(22) Filed: Sep. 25, 2018

(65) Prior Publication Data

US 2019/0100248 A1 Apr. 4, 2019

(30) Foreign Application Priority Data

Oct. 2, 2017 (JP) .................................. 2017-192996

(51) Int. Cl.
*B62D 25/04* (2006.01)
*B62D 25/02* (2006.01)

(52) U.S. Cl.
CPC ............. *B62D 25/04* (2013.01); *B62D 25/02* (2013.01)

(58) Field of Classification Search
CPC ................................ B62D 25/04; B62D 25/02
See application file for complete search history.

(56) References Cited

U.S. PATENT DOCUMENTS

| 2010/0084892 A1 | 4/2010 | Yoshida et al. |
| 2012/0267919 A1 | 10/2012 | Yoshida et al. |
| 2014/0008937 A1 | 1/2014 | Yoshida et al. |
| 2014/0319877 A1* | 10/2014 | Hida ..................... B62D 25/02 296/191 |

FOREIGN PATENT DOCUMENTS

| JP | 2003-127898 A | 5/2003 |
| JP | 2012-188115 A | 10/2012 |

* cited by examiner

*Primary Examiner* — D Glenn Dayoan
*Assistant Examiner* — Melissa Ann Bonifazi
(74) *Attorney, Agent, or Firm* — Oliff PLC

(57) ABSTRACT

A front pillar as a part of an upper arch structure joins an outer member and an inner member and is formed to have a closed cross-sectional structure. An upper bead and a lower bead are formed adjacent to side edge sections, each of which extends in a longitudinal direction of the inner member. The upper bead has a U-shaped cross-sectional shape. Due to the U-shaped cross section, second moment of area is increased, and thus strength of the front pillar is increased. In addition, the U-shaped cross section has a larger number of ridge lines than does a chevron cross section, and thus springback is suppressed.

3 Claims, 4 Drawing Sheets

INNER SIDE ⟵⟶ OUTER SIDE

INNER SIDE ⟵⟶ OUTER SIDE

UPPER ARCH STRUCTURE OF VEHICLE BODY LATERAL SECTION

CROSS REFERENCE TO RELATED APPLICATION

The disclosure of Japanese Patent Application No. 2017-192996 filed on Oct. 2, 2017 including the specification, claims, drawings, and abstract is incorporated herein by reference in its entirety.

TECHNICAL FIELD

The present disclosure relates to a frame structure of a vehicle body lateral section and, in particular, to an upper arch structure thereof.

BACKGROUND

A vehicle body lateral section, for example, an automobile is provided with: plural pillars, each of which is vertically provided in a body lower structure; and a roof side rail that extends in a longitudinal direction of the vehicle to connect upper ends of the pillars. A roof is provided between the right and left roof side rails, and each of the pillars supports the roof via the roof side rail. A front pillar is often inclined rearward along an inclination of a windshield glass, and a rear pillar is often inclined forward. The front pillar, the roof side rail, and the rear pillar form an arch shape as a whole. Hereinafter, a structure that is constructed of the front pillar, the roof side rail, and the rear pillar will be described as an upper arch structure.

In the paragraph 0011 in PATENT DOCUMENT 1 below, it is introduced that in recent years a high tensile steel plate has frequently been used for a body strength member. In addition, a vehicle body lateral structure is disclosed in the paragraphs 0246 to 0262 of the same document. In the vehicle body lateral structure, a reinforcing member (70, 70-1) that is made of a high-strength steel material and has a closed cross section is arranged in an arch structure that is constructed of pillars (63, 67) and a roof side rail (65). Note that the above reference signs in the parentheses are reference signs used in PATENT DOCUMENT 1 below and are not related to reference signs used in embodiments of the present application.

CITATION LIST

PATENT DOCUMENT 1: JP 2012-188115 A

SUMMARY

Technical Problem

The upper arch structure of the vehicle body lateral section includes the strength member that receives a load in the event of a frontal or rear collision, and high strength thereof is demanded. Meanwhile, the upper arch structure is demanded to be thin so as to provide an occupant, particularly, a driver, with improved visibility. Thus, the upper arch structure is demanded to be thin and highly strengthened, and there is room for improvement in a shape and the strength thereof.

In addition, in the case where the high tensile steel plate is used for the upper arch structure, there is a problem that a considerable amount of springback is observed in a forming process of the high tensile steel plate.

The present disclosure has a purpose of increasing strength of an upper arch structure and suppressing springback of a high tensile steel plate used for the upper arch structure.

Solution to Problem

An upper arch structure of a vehicle body lateral section according to the present disclosure includes: an outer member that extends along a longitudinal direction of this upper arch structure and is located on an outer side in a lateral direction of the vehicle; and an inner member that extends along the longitudinal direction of this upper arch structure, is located on an inner side in the lateral direction of the vehicle, has side edge sections on both sides, each of which extends in the longitudinal direction and is joined to the outer member, and forms a closed cross-sectional structure with the outer member. The inner member is formed with a bead that is adjacent to at least one of the side edge sections extending in the longitudinal direction of the inner member, that has a U-shaped cross-sectional shape projected toward the outer member, and that extends along this side edge section.

The inner member is formed with the bead in the U-shaped cross-sectional shape. Thus, as compared with a case where a bead in a chevron cross-sectional shape is formed or a case where a bead is not formed, second moment of area is increased, strength of the upper arch structure is improved, and springback can be suppressed by the bead.

The inner member may have a twisted shape in the longitudinal direction of the vehicle. In the case where a long plate member is formed to be twisted in a longitudinal direction of the plate member, the springback occurs in a manner to cancel twisting. However, the springback can be suppressed by providing the bead.

The bead can be formed adjacent to the side edge section on an upper side of the inner member in a vertical direction of the vehicle. High stress is generated in an upper portion of the upper arch structure in the event of a frontal collision. However, since the bead is provided in the upper side edge section, the strength of the upper arch structure can effectively be increased.

Furthermore, the upper arch structure can include a reinforcing member that extends along the longitudinal direction of the upper arch structure and is joined to an inner surface of the outer member. This reinforcing member has an opposing edge section that extends from a portion joined to the outer member and has an end edge opposing a lower surface of the bead in the vertical direction of the vehicle. When the upper arch structure is deformed, the opposing edge section of the reinforcing member abuts the bead of the inner member, so as to suppress further deformation of the upper arch structure.

Advantageous Effects of Invention

In the upper arch structure of the vehicle body lateral section, the inner member is provided with the bead in the U-shaped cross-sectional shape. Thus, the strength of the upper arch structure can be increased. In addition, the springback in a forming process of the inner member can be suppressed by the bead.

BRIEF DESCRIPTION OF DRAWINGS

Embodiments of the present disclosure will be described by reference to the following figures, wherein.

DESCRIPTION OF EMBODIMENTS

Figure 1:
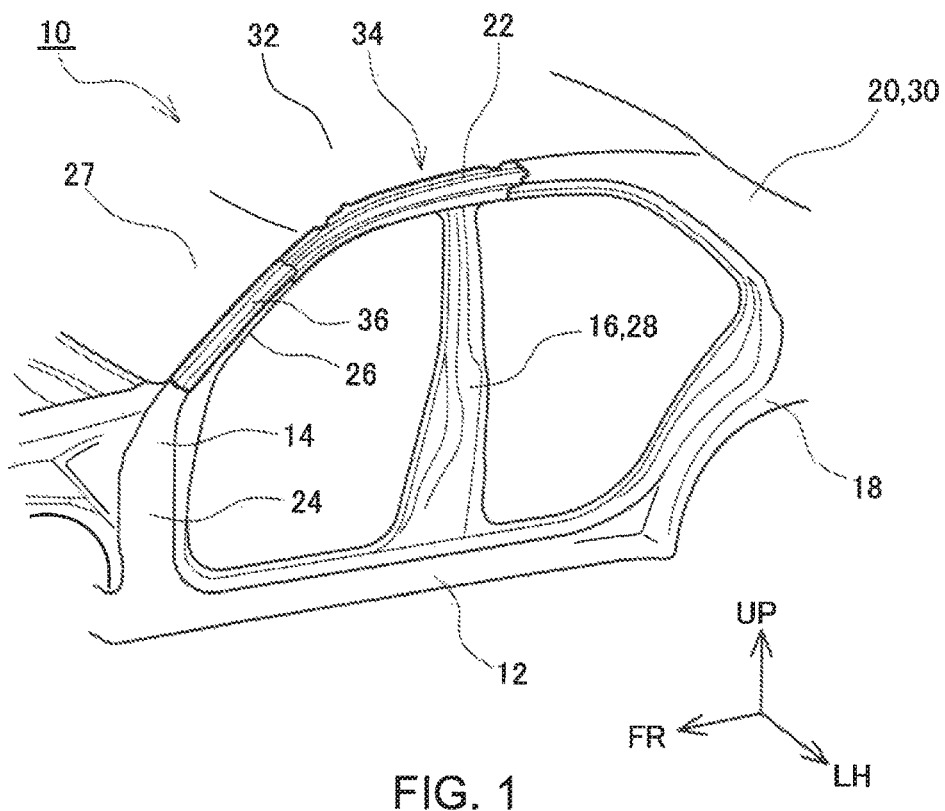
FIG. 1 is a view of a vehicle body lateral section of a vehicle.

A description will hereinafter be made on embodiments of the present disclosure by reference to the drawings. FIG. 1 illustrates a structure of a left section of a vehicle body 10 of a vehicle, particularly, a sedan-type passenger vehicle. In FIG. 1, a direction indicated by an arrow FR is a front direction of the vehicle, a direction indicated by an arrow UP is an upward direction of the vehicle, and a direction indicated by an arrow LH is a lateral direction of the vehicle. In the description below, unless otherwise indicated, positions such as "front," "rear," "right," "left" "upper" and "lower" indicate the positions relative to the vehicle. Note that a vehicle body lateral section on a right side is symmetrical to the vehicle body lateral section illustrated in FIG. 1.

The vehicle body lateral section includes: a rocker section 12 that extends in the longitudinal direction of the vehicle on a side of a floor member; a front pillar member 14 and a central pillar member 16, each of which is vertically provided from the rocker section 12; a rear wheel housing section 18 that is provided rearward from the rocker section 12; a rear pillar member 20 that is vertically provided from the rear wheel housing section 18; and a roof side rail 22 that extends in the longitudinal direction of the vehicle to connect upper ends of these pillar members 14, 16, 20.

The front pillar member 14 includes: a dashboard side section 24 that is vertically provided from a front end of the rocker section 12; and a front pillar 26 that extends upward and rearward from an upper end of the dashboard side section 24 and reaches the roof side rail 22. The front pillar 26 is located on a boundary between a windshield 27 and a front door window, which is not illustrated. The central pillar member 16 is a center pillar 28 that is vertically provided in a central portion of the rocker section 12 in the longitudinal direction of the vehicle. The center pillar 28 is located between a front door and a rear door, which are not illustrated.

The rear wheel housing section 18 is connected to a rear end of the rocker section 12, forms a space for accommodating a rear wheel, and forms a lateral wall of a luggage compartment. The rear pillar member 20 is a rear pillar 30 that extends upward and forward from a front end of an upper edge of the rear wheel housing section 18 and reaches the roof side rail 22. The roof side rail 22 extends in the longitudinal direction of the vehicle at a lateral edge of a roof 32.

The front pillar 26, the roof side rail 22, and the rear pillar 30 are located in an upper portion of the vehicle body lateral section and display an arch shape as a whole that is projected upward when seen in the lateral direction. Hereinafter, the front pillar 26, the roof side rail 22, and the rear pillar 30 will collectively be described as an upper arch structure 34.

The vehicle body 10 has a frame structure with strength and surface members that cover the frame structure. In FIG. 1, the front pillar 26 and the roof side rail 22 are partially illustrated in a state where the surface members are removed and the frame structure is visible. The frame structure of the upper arch structure 34 is formed by connecting plural long plate-shaped members, each of which extends along the longitudinal direction of the upper arch structure 34.

Figure 2:
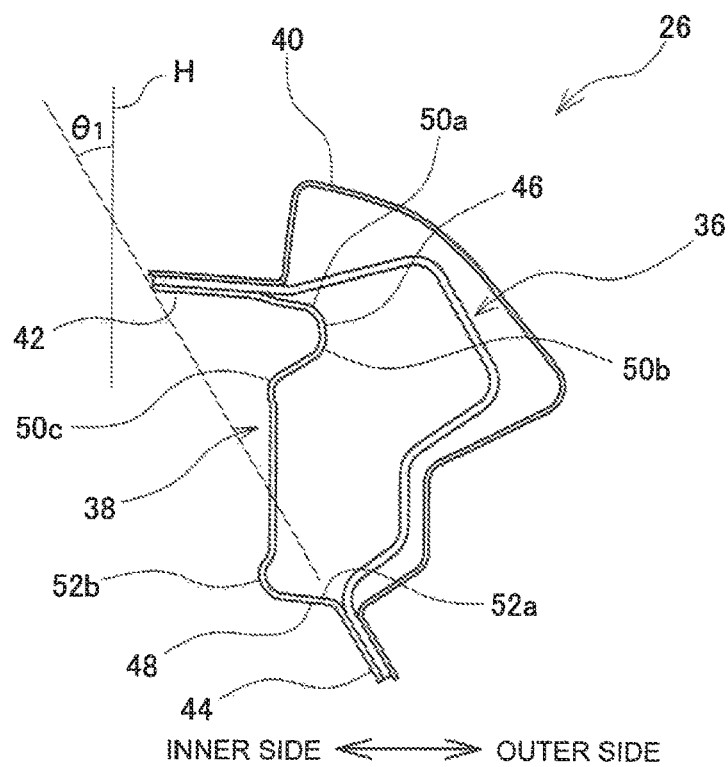
FIG. 2 is a cross-sectional view of a front pillar that is taken along line A-A in FIG. 4.
Figure 3:
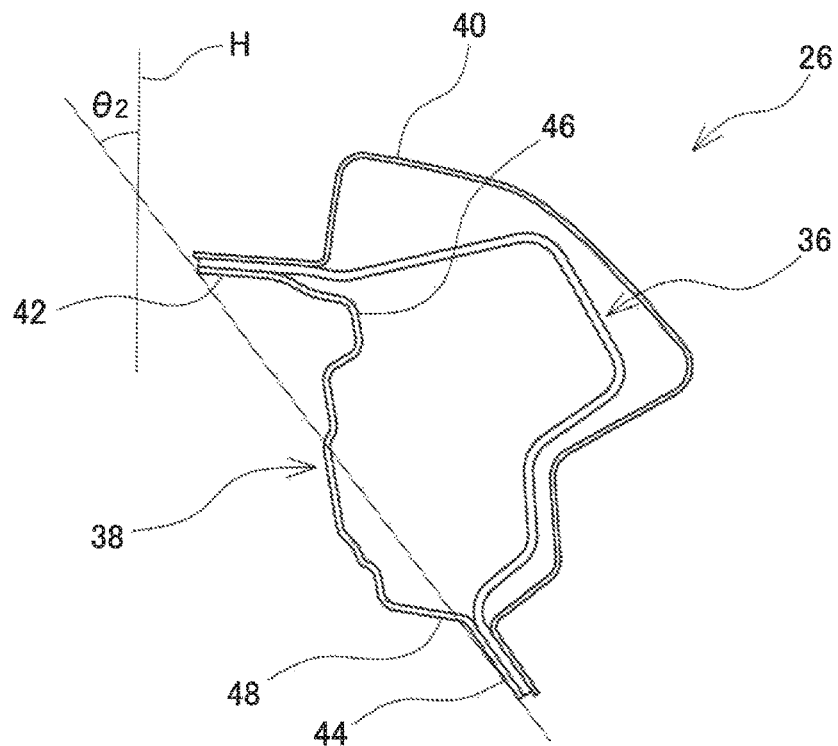
FIG. 3 is a cross-sectional view of the front pillar that is taken along line B-B in FIG. 4.
Figure 4:
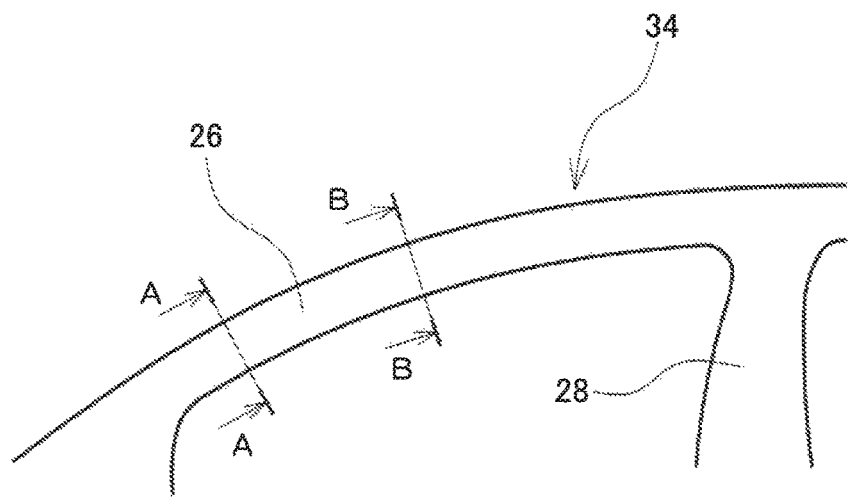
FIG. 4 is a view that indicates positions of the cross sections in FIGS. 2 and 3.

FIG. 2 is a cross-sectional view of the front pillar 26 that is taken along line A-A in FIG. 4, and FIG. 3 is a cross-sectional view of the front pillar 26 that is taken along line B-B in FIG. 4. In each of FIGS. 2 and 3, a right side is an outer side in the lateral direction of the vehicle, and a left side is an inner side; that is, a vehicle cabin side in the lateral direction of the vehicle.

The front pillar 26 includes: an outer member 36 and an inner member 38, each of which forms the frame structure; and an outer surface member 40 that forms an outer surface of the vehicle body 10. Each of the outer member 36 and the inner member 38 is formed by pressing a long steel plate to have an illustrated cross-sectional shape. Then, the outer member 36 and the inner member 38 are joined to each other at edge sections that extend longitudinally on both sides thereof, by a method such as welding. In this way, a body frame structure having a closed cross-sectional structure is formed. In the lateral direction of the vehicle, the outer member 36 is located on the outer side, and the inner member 38 is located on the inner side. Each of the outer member 36 and the inner member 38 may extend over the entire length of the front pillar 26 or may be arranged in a portion of the front pillar 26 in the longitudinal direction. In the latter case, the front pillar 26 is configured by connecting plural members. Alternatively, each of the outer member 36 and the inner member 38 may be a member that extends from the front pillar 26 to the roof side rail 22.

The outer surface member 40 is arranged on the further outer side of the outer member 36 and is joined to the outer member 36 or to both of the outer member 36 and the inner member 38 by a method such as welding.

Figure 5:
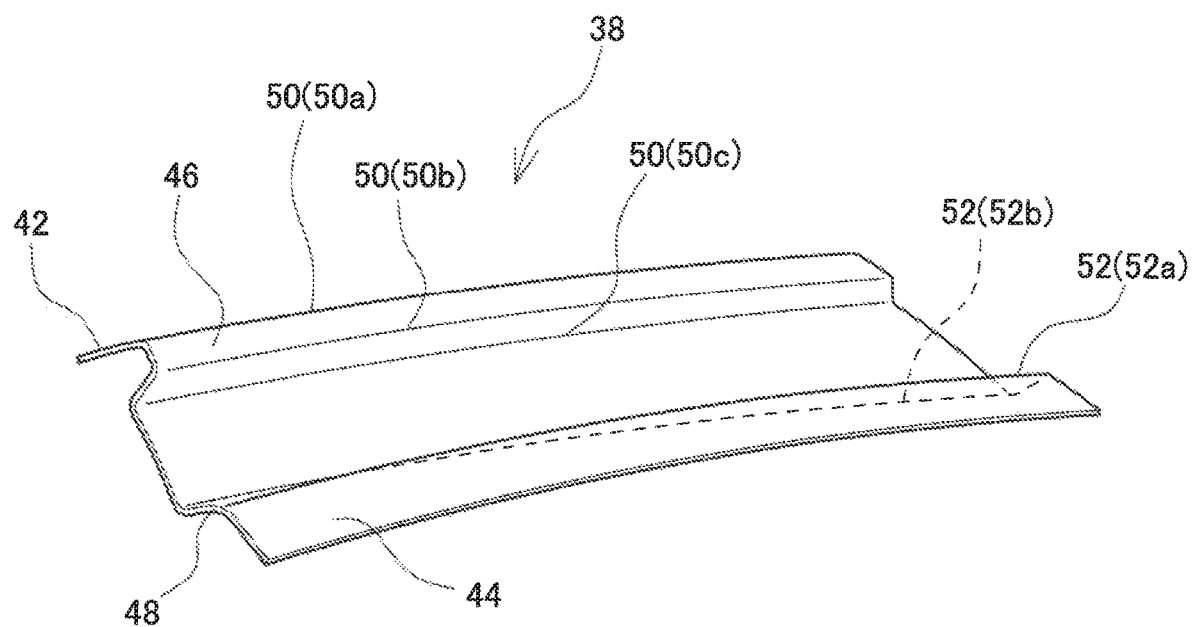
FIG. 5 is a view of a schematic shape of an inner member.

FIG. 5 is a view of a schematic shape of the inner member 38 as a lone member. The inner member 38 is joined to the outer member 36 at both side edge sections 42, 44, each of which extends in the longitudinal direction. The joining method can be welding as described above, in particular, spot welding. Alternatively, the inner member 38 may be joined to the outer member 36 by using an adhesive. The inner member 38 is formed with beads 46, 48 that are adjacent to the side edge sections 42, 44 and extend along the side edge sections 42, 44, respectively. The bead 46 that is located on an upper side in a vehicle vertical direction will be described as an upper bead 46, and the other bead will be described as a lower bead 48. The upper bead 46 has a substantially U-shaped cross-sectional shape and extends in a ridge shape over the entire length of the inner member 38. The lower bead 48 has a chevron cross-sectional shape and extends in a ridge shape over the entire length of the inner member 38.

The inner member 38 has a twisted shape in the longitudinal direction. When FIG. 2 and FIG. 3 are compared, the inner member 38 has a greater inclination in a rear portion of the vehicle (FIG. 3) than in a front portion of the vehicle (FIG. 2) with respect to a vertical surface H that is orthogonal to the lateral direction of the vehicle ($\theta 2 > \theta 1$). This is because the inward inclination of a lateral surface of the vehicle is increased upwardly. In the case where a flat plate member is formed in a twisted shape by pressing or the like, the formed member attempts to be deformed such that twisting thereof is cancelled. An amount of this springback is increased as a magnitude of strength of the steel plate is increased. In the forming process, the amount of the springback is estimated in advance, and the plate member is excessively deformed. However, it is desired that the amount of the springback is small, from a perspective of dimensional accuracy.

In the inner member 38, the upper bead 46 and the lower bead 48 are provided adjacent to the side edge sections on both of the sides, and the upper bead 46 has the U-shaped cross-sectional shape. In this way, the amount of the springback is suppressed to be small. The number of ridge lines in the U-shaped cross section of a bead is larger than that in the chevron cross section. Thus, the amount of the springback can be reduced. The upper bead 46 of the inner member 38 has three ridge lines 50 (50a, 50b, 50c) (see FIG. 5). For example, in the case where the U-shaped cross section is adopted, the number of the ridge lines is increased as compared to a case where the upper bead has the chevron cross section, by eliminating the ridge line 50b and connecting the ridge line 50a and the ridge line 50c by a plane. The chevron cross section of the lower bead 48 has two ridge lines 52 that are denoted by reference signs 52a, 52b. However, the lower bead 48 may have a U-shaped cross section to suppress the springback in the forming process.

In addition, since the upper bead 46 has the U-shaped cross section, the front pillar 26 has a large second moment of area when compared to a case where the upper bead 46 has the chevron cross section. Thus, strength of the front pillar 26 is increased. In the front pillar 26, high stress is usually generated in an upper portion thereof. Thus, in the inner member 38 of this embodiment, the upper bead 46 has the U-shaped cross section. However, in the case where the high stress is generated in a lower portion of the front pillar 26, the lower bead 48 may have the U-shaped cross section. In addition, each of the upper and lower beads 46, 48 may have the U-shaped cross section.

Figure 6:
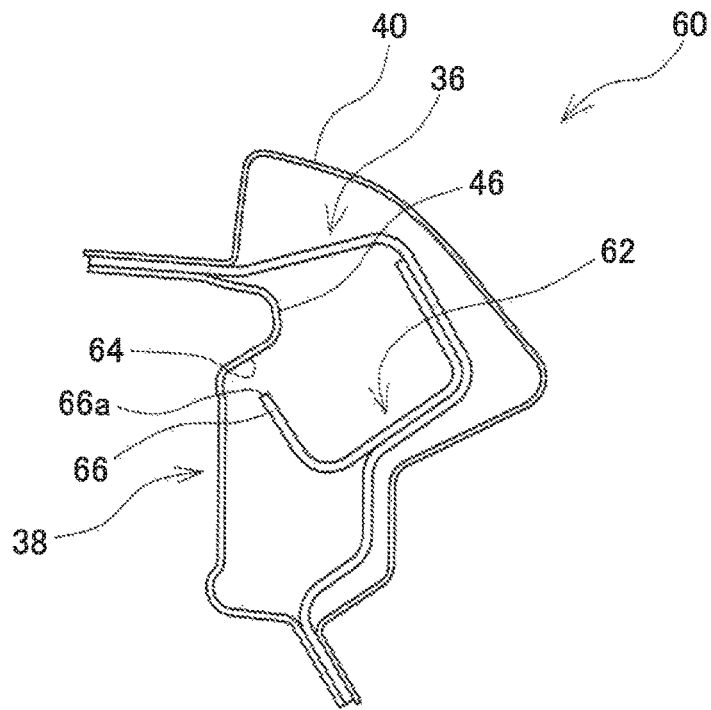
FIG. 6 is a cross-sectional view of another front pillar.

FIG. 6 is a view of an upper arch structure, particularly, a front pillar 60 in another embodiment of the present disclosure. Similar to FIG. 2 and FIG. 3, the right side in the drawing is the outer side in the lateral direction of the vehicle, and the left side in the drawing is the inner side in the lateral direction of the vehicle. Components similar to those of the above-described front pillar 26 will be denoted by the same reference signs, and the descriptions thereof will not be repeated.

The front pillar 60 has a reinforcing member 62 in a closed cross-sectional space that is formed by the outer member 36 and the inner member 38. The reinforcing member 62 has a substantially U-shaped cross-sectional shape and is arranged in a manner to extend along the outer member 36. The reinforcing member 62 is joined to an inner surface of a portion of the outer member 36, and the portion is projected to the outside. As a joining method, welding, adhesion by an adhesive, or the like can be adopted. The reinforcing member 62 has an opposing edge section 66 that extends inward from the portion joined to the outer member 36 and further extends from a lower side toward a surface 64 on a lower side of the upper bead 46. An end edge 66a of the opposing edge section 66 opposes the surface 64 of the upper bead 46 with a space being interposed therebetween.

Figure 7:
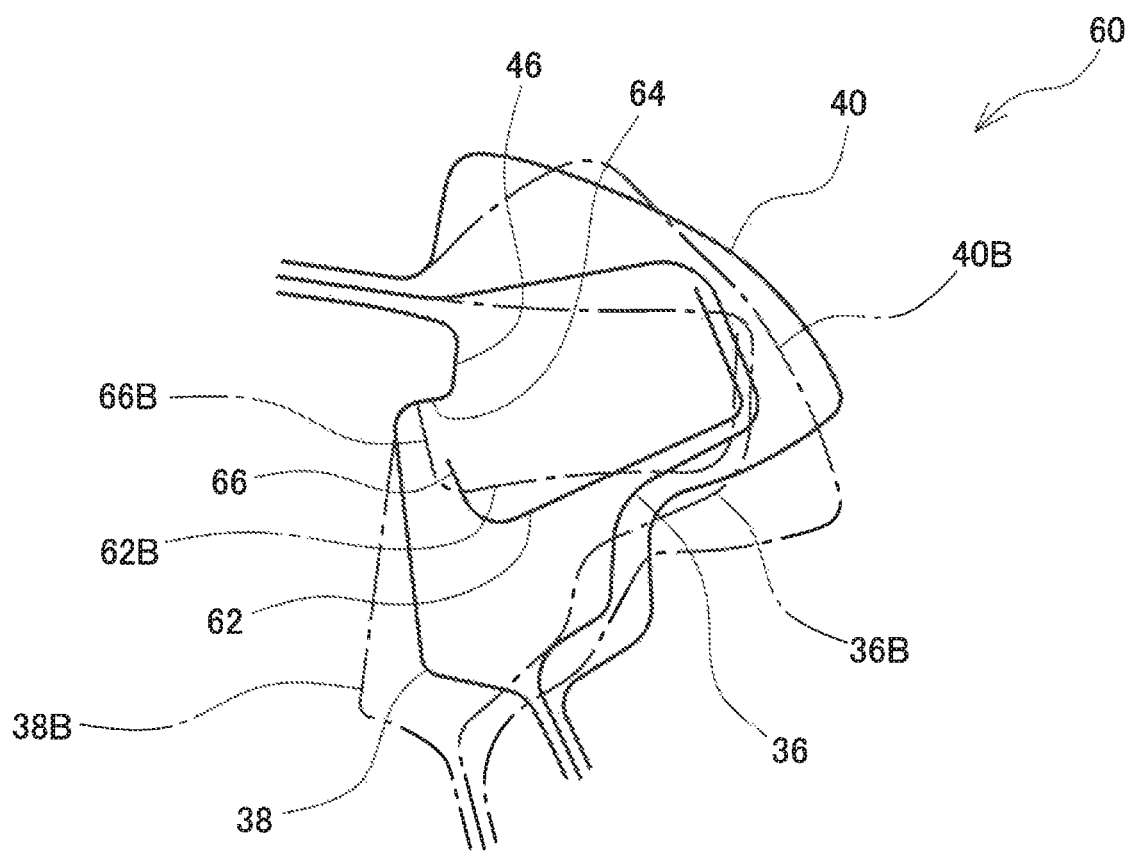
FIG. 7 is a view of deformation of the front pillar illustrated in FIG. 6 in the event of a frontal collision.

FIG. 7 is a schematic view of deformation of the front pillar 60 in the event of the frontal collision. A shape before the deformation is indicated by solid lines, and a shape after the deformation is indicated by one-dot chain lines. In addition, each of the components before the deformation is denoted by the same reference sign as that described above, and each of the components after the deformation is denoted by the reference sign before the deformation and the suffix "B." The opposing edge section 66 of the reinforcing member 62, which opposes the upper bead 46 with the space being interposed therebetween, approaches the surface 64 of the upper bead 46 in conjunction with the deformation of the front pillar 60 and abuts the surface 64 of the upper bead 46. Once abutting, the reinforcing member 62 receives a load generated by the deformation and resists the further deformation of the front pillar 60. In this way, the deformation of the cross-sectional shape of the front pillar 60 is suppressed, and the strength of the front pillar 60 is increased.

High tensile steel with tensile strength of 1200 to 1500 MPa, for example, can be used for each of the outer member 36 and the inner member 38. In addition, a steel material with tensile strength of 590 MPa, for example, can be used for the reinforcing member 62.

The description has been made so far on the frame structure of the central portion of the front pillar. However, the present disclosure is not limited thereto, and a structure similar to the above-described structure can be adopted for another portion of the upper arch structure. In addition, the present disclosure is not limited to the sedan-type passenger vehicle and can also be adopted for a two-door vehicle, a minivan, a station wagon, and the like. In the case of the minivan and the station wagon, in addition to a pillar that is located between the cabin and luggage spaces (corresponding to the rear pillar of the sedan), a pillar exists in a rearmost portion of the luggage space. The above-described structure can also be adopted for this pillar.

REFERENCE SIGNS LIST

10: Vehicle body
12: Rocker section
14: Front pillar member
16: Central pillar member
18: Rear wheel housing section
20: Rear pillar member
22: Roof side rail
24: Dashboard side section
26: Front pillar
27: Windshield
28: Center pillar
30: Rear pillar
32: Roof
34: Upper arch structure
36: Outer member
38: Inner member
40: Outer surface member
42, 44: Side edge section of inner member
46: Upper bead
48: Lower bead
50: Ridge line of upper bead
52: Ridge line of lower bead
60: Front pillar
62: Reinforcing member
64: Lateral surface on lower side of upper bead
66: Opposing edge section

The invention claimed is:

1. An upper arch structure of a vehicle body lateral section, comprising:
    an outer member that extends along a longitudinal direction of the upper arch structure and is located on an outer side in a lateral direction of the vehicle; and
    an inner member that extends along the longitudinal direction of the upper arch structure, is located on an inner side in the lateral direction of the vehicle, has side edge sections on both sides, each of which extends in the longitudinal direction and is joined to the outer member, and forms a closed cross-sectional structure with the outer member, wherein the inner member is formed with a bead that is adjacent to at least one of the side edge sections of the inner member, that has a U-shaped cross-sectional shape projected toward the outer member, and that extends along the side edge section, wherein the bead is formed adjacent to the side edge section on an upper side in a vertical direction of the vehicle.

2. The upper arch structure of the vehicle body lateral section according to claim 1, wherein the inner member has a twisted shape in the longitudinal direction of the vehicle.

3. The upper arch structure of the vehicle body lateral section according to claim 1, further comprising:

a reinforcing member that extends along the longitudinal direction of the upper arch structure and is joined to an inner surface of the outer member, the reinforcing member having an opposing edge section that extends from a portion joined to the outer member and has an end edge opposing a lower surface of the bead in the vertical direction of the vehicle.

* * * * *